United States Patent
Taylor et al.

(10) Patent No.: US 11,104,001 B2
(45) Date of Patent: Aug. 31, 2021

(54) MOTION TRANSFER OF HIGHLY DIMENSIONAL MOVEMENTS TO LOWER DIMENSIONAL ROBOT MOVEMENTS

(71) Applicant: SONY INTERACTIVE ENTERTAINMENT INC., Tokyo (JP)

(72) Inventors: Michael G. Taylor, San Mateo, CA (US); Sergey Bashkirov, Novato, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 265 days.

(21) Appl. No.: 16/352,023

(22) Filed: Mar. 13, 2019

(65) Prior Publication Data
US 2020/0290203 A1    Sep. 17, 2020

(51) Int. Cl.
*B25J 9/16*    (2006.01)
(52) U.S. Cl.
CPC ............ *B25J 9/1671* (2013.01); *B25J 9/161* (2013.01); *B25J 9/163* (2013.01)
(58) Field of Classification Search
CPC ........ B25J 9/1697; B25J 9/1671; B25J 9/161; B25J 9/163; B25J 9/1653; B25J 9/1065; G05B 2219/40499; G05B 2219/40517; G05B 2219/40525; G05B 2219/40526; G05B 2219/40527; G05B 2219/40391; G06N 99/005
See application file for complete search history.

(56) References Cited

U.S. PATENT DOCUMENTS 9,165,199 B2 * 10/2015 Zhu .................. G06K 9/32
2004/0036437 A1   2/2004 Ito
(Continued)

FOREIGN PATENT DOCUMENTS

KR    20100026785    3/2010

OTHER PUBLICATIONS

Marija Tomić, Christine Chevallereau, Kosta Jovanović, Veljko Potkonjak, Aleksandar Rodić. Human to humanoid motion conversion for dual-arm manipulation tasks. Robotica, Cambridge University Press, 2018, 36 (8), pp. 1167-1187. ff10.1017/S0263574718000309ff. ffhal-01819258f (Year: 2018).*
(Continued)

*Primary Examiner* — Jeff A Burke
*Assistant Examiner* — Joshua Alexander Garza
(74) *Attorney, Agent, or Firm* — Kilpatrick Townsend & Stockton LLP

(57) ABSTRACT

Techniques for transferring highly dimensional movements to lower dimensional robot movements are described. In an example, a reference motion of a target is used to train a non-linear approximator of a robot to learn how to perform the motion. The robot and the target are associated with a robot model and a target model, respectively. Features related to the positions of the robot joints are input to the non-linear approximator. During the training, a robot joint is simulated, which results in movement of this joint and different directions of a robot link connected thereto. The robot link is mapped to a link of the target model. The directions of the robot link are compared to the direction of the target link to learn the best movement of the robot joint. The training is repeated for the different links and for different phases of the reference motion.

21 Claims, 8 Drawing Sheets

(56) References Cited

U.S. PATENT DOCUMENTS

| | | | | |
|---|---|---|---|---|
| 2004/0254679 | A1* | 12/2004 | Nagasaka | B62D 57/032 |
| | | | | 700/245 |
| 2005/0001842 | A1* | 1/2005 | Park | G06T 13/40 |
| | | | | 345/474 |
| 2007/0255454 | A1* | 11/2007 | Dariush | G06N 3/008 |
| | | | | 700/245 |
| 2010/0250001 | A1 | 9/2010 | Hodgins et al. | |
| 2010/0277483 | A1* | 11/2010 | Lee | G06T 13/40 |
| | | | | 345/474 |
| 2012/0143374 | A1 | 6/2012 | Mistry et al. | |
| 2013/0211586 | A1* | 8/2013 | Lee | B62D 57/032 |
| | | | | 700/245 |
| 2016/0046023 | A1* | 2/2016 | Nagendran | B25J 9/1689 |
| | | | | 700/248 |
| 2018/0089553 | A1 | 3/2018 | Liu et al. | |
| 2019/0371080 | A1* | 12/2019 | Sminchisescu | G06T 19/00 |
| 2020/0175266 | A1* | 6/2020 | Murakami | G06K 9/00369 |

OTHER PUBLICATIONS

Xue Bin Peng, Pieter Abbeel, Sergey Levine, and Michiel van de Panne. 2018. DeepMimic: Example-Guided Deep Reinforcement Learning of PhysicsBased Character Skills. ACM Trans. Graph. 37, 4, Article 143 (Aug. 2018), 18 pages. https://doi.org/10.1145/3197517.3201311. (Year: 2018).*

Peng et al., "DeepMimic: Example-Guided Deep Reinforcement Learning of Physics-Based Character Skills," ACM Trans. Graph., vol. 37, No. 4, Article 143, Aug. 2018, 18 pages.

PCT/US2020/018590, "International Search Report and Written Opinion", dated Jun. 12, 2020, 9 pages.

* cited by examiner

MOTION TRANSFER OF HIGHLY DIMENSIONAL MOVEMENTS TO LOWER DIMENSIONAL ROBOT MOVEMENTS

CROSS-REFERENCES TO RELATED APPLICATIONS

NOT APPLICABLE

BACKGROUND

Advancements in robotics have permitted different applications. For example, a robot can be designed to perform a human-like motion, such as greeting people, playing a game, or other motion-related applications.

Generally, a design goal is for a robot to mimic a motion of a human while preserving balance. Simulating a motion while preserving balance can be a challenging problem as a robot controller may need to figure out not just joints pose of time dependencies, but also how to change motion as a whole to fit different joint kinematic structure and a how to dynamically react on deviations from target motion and prevent falling. Technical design challenges stem from the difference between the dimensionalities of the human and the robot (e.g., degrees of freedom). For instance, whereas a joint of the human can have three degrees of freedom, a corresponding joint of the robot has smaller degrees of freedom due to mechanical and/or control constraints. Such constraints typically hinder how the robot controls its joints, resulting in a motion that is noticeably different than the human's motion.

Hence, there is a need to improve the robotic motion even in the presence of dimensionality constraints.

BRIEF SUMMARY

Generally, techniques, including methods and systems, for transferring highly dimensional movements to lower dimensional robot movements are described. In an example, the techniques involve accessing a robot model of a robot. The model includes a robot joint and a robot link. The robot joint is connected to the robot link and has a first amount of degrees of freedom. The techniques also involve accessing a mapping between the robot link and a target link of a target model. The target model includes a target joint and a target link. The target joint is connected to the target link and has a second amount of degrees of freedom that is larger than the first amount. The techniques also involve accessing a reference motion of the target model and training a non-linear approximator to output joint control signals such that the robot mimics the reference motion while preserving balance. The training includes simulating a position of the robot joint and inputting the position of the robot joint to the non-linear approximator. The training also includes determining a simulated direction of the robot link based on the position of the robot joint and determining a target direction of the target link based on the reference motion. The training also includes computing a reward function of the non-linear approximator based on the simulated direction of the robot link and the target direction of the target link, and based on root orientation and root angular velocity of the robot model. The training also includes updating parameters of the non-linear approximator based on the reward.

In an example, the non-linear approximator comprises a set of neural networks. The training includes reinforcement learning that uses a distance metric between the simulated direction of the robot link and the target direction of the target link and that uses the root orientation, and the root angular velocity.

In an example, the simulated direction is a first unit vector along the robot link. The target direction is a second unit vector along the target link. The reward function includes a distance between the first unit vector and the second unit vector.

In an example, accessing the reference motion includes accessing motion capture data of the target model. The motion capture data identifies target links of the target model in multiple pose frames, and target directions of the target links in each image frame. The target directions are determined from orientations (e.g., angles) of target joints of the target model. In this example, the training includes multiple pose simulation iterations corresponding to a sequence of pose frames, where the orientation (e.g., angle) of the robot joint is updated in each simulation iteration. In this example also, the mapping maps a subset of the target links of the target model (e.g., the target's links directions/unit direction vectors) with robot links of the robot model (e.g., the robot's link directions/direction unit vectors). Each training iteration in each image frame includes computing simulated directions of the robot links and target directions of the subset of the target links. The reward function is computed based on the simulated directions and the target directions, the root orientation, and the root angular velocity.

In an example, the training further includes inputting a velocity and a torque of the robot joint, a phase of a motion of the target motion, and torso absolute orientation of the robot to the non-linear approximator. The reward function is further computed based on a simulated angular velocity of the robot link, a target angular velocity of the target link, and an indicator of whether the robot link is on ground.

In an example, the orientation of the robot joint is simulated in a training iteration. Simulating the orientation of the robot joint includes adding first noise to a previous orientation of the robot joint in a previous training iteration, the first noise corresponding to a perturbation of the robot joint in an exploration space. Simulating the orientation of the robot joint further includes adding second noise to the previous position of the robot joint. The second noise corresponds to an error tolerance between the robot model and the robot.

In an example, the techniques further include installing the non-linear approximator in the robot upon completion of the training. The robot inputs current augmented joint angles and torso orientation to the non-linear approximator and receives joint actuator control inputs from the non-linear approximator controlling the target motion.

A further understanding of the nature and the advantages of the embodiments disclosed and suggested herein may be realized by reference to the remaining portions of the specification and the attached drawings.

DETAILED DESCRIPTION

Figure 1:
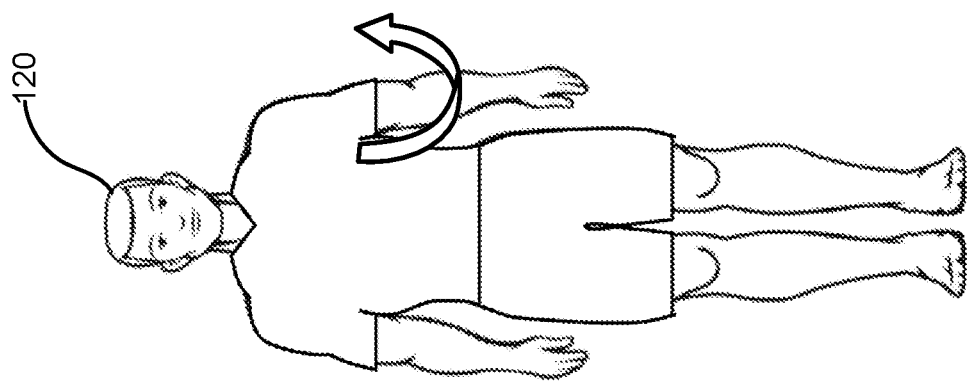
FIG. 1 illustrates an example robot mimicking a motion of a human, according to embodiments of the present disclosure.
Figure 1:
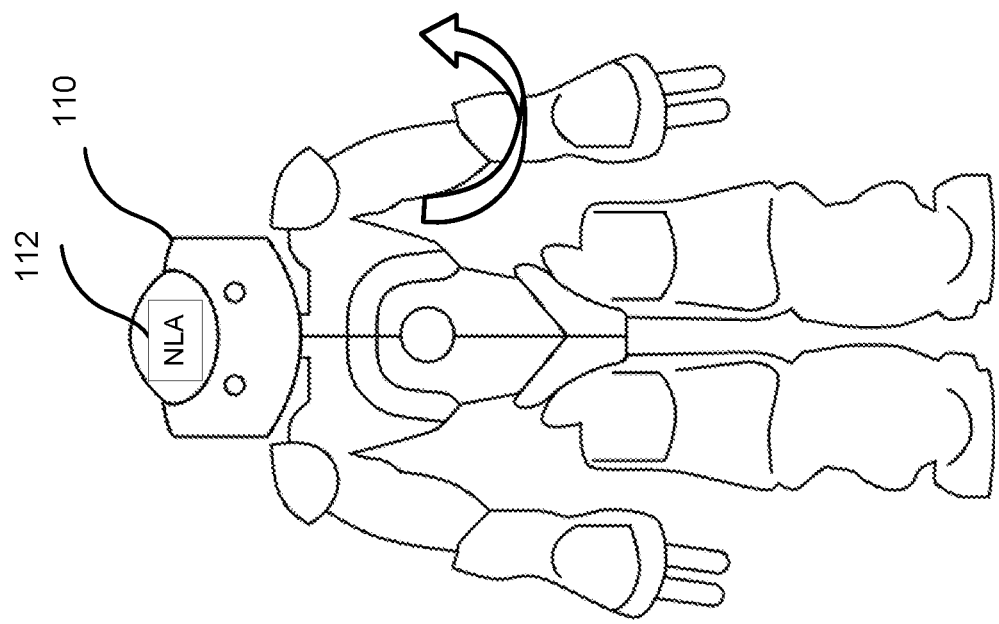

Generally, techniques for transferring highly dimensional movements to lower dimensional robot movements are described. In an example, reference motions of a target (e.g., a human) are used to train a robot to mimic the target's motions while preserving balance of the robot. The robot and the target are associated with a robot model and a target model, respectively. The robot model has a lower dimensionality (e.g., degrees of freedom of joints) and different physical properties (e.g., body mass distribution, size, etc.) than the target model. Because of at least the dimensionality differences, directions of links rather than orientations of joints are used to learn how to mimic the reference motions. In particular, a non-linear approximator, such as a neural network, is designed to approximate the reference motions. This non-linear approximator is trained based on motion capture data representing the target's reference motions. Inputs to the non-linear approximator include data related to joints of the robot model (e.g., joint positions, joint velocities, joint torques). During the training, the non-linear approximator learns how to control the joints of the robot based on a reward function that uses the directions of the links of the robot model and of the target model. Upon completion of the training, the non-linear approximator is installed in the robot. In response to joint-related data and a desired motion, the non-linear approximator output signals for controlling the joints (e.g., joint angles) to the robot such that the robot performs the motion.

To illustrate, consider an example of a robot designed to greet people. The motions that the robot should perform include handshaking by moving an "elbow" joint to extend its "forearm" link and controlling a "wrist" joint to move its "hand" link. Motion capture (mocap) data about how human handshaking is available. This data is captured in multiple image frames. Each image frame includes, for instance, orientations of the human's elbow, forearm, wrist, and hand during a phase of the handshake. Of interest are the directions of the forearm and hand (e.g., the links) in each of these frames and such directions can be derived as a unit vector along each link from the relevant orientation data.

In this illustrative example, a neural network is used as the non-linear approximator. Reinforcement learning is implemented to train the neural network, where the agent is the neural network, the environment is simulations of handshaking, the state is the positions of the robot's elbow and wrist, and the action is movement of the robot's elbow and wrist. The reward is defined as a reward function that uses distance metrics, such as the Euclidean distances, between unit vectors corresponding to link directions.

For the training, the forearm and hand from the robot model (referred to herein as robot forearm and robot hand) are mapped to the forearm and hand from the human model (referred to herein as human forearm and human hand). During the training, the elbow and wrist from the robot model (referred to herein as robot elbow and robot wrist) are iteratively perturbed to generate robot elbow positions and robot wrist positions that are input to the neural network. Each set of iterative perturbations corresponds to an image frame and results in robot forearm directions and robot hand directions that can be compared to the mocap data specific to that image frame. In particular, each image frame shows one human forearm direction and one human hand direction. However, multiple robot forearm directions and multiple robot hand directions are associated with that image frame and represent the exploration space (e.g., the different actions that can be performed to move the robot forearm and the robot hand). The neural network determines from each image frame and from the exploration space the closest robot forearm direction and closest robot hand direction to the human forearm direction and human hand direction, respectively. Hence, over the different image frames, the neural network learns the best robot elbow positions and the best robot wrist positions that result in the closest robot forearm directions and the closest robot hand directions that can mimic the human's handshaking motion shown in the mocap data. Upon completion of the training and in response to inputting a current state of the robot's elbow and wrist to the neural network, this network output control signals for moving these joints in a motion that is very like a human handshaking motion.

Embodiments of the present disclosure provide various technical advantages. For example, the robot is capable of moving in a human-like motion despite the differences in the dimensionality and physical properties. In addition, the robot's performance can be robust even when the training uses a small set of mocap data. Further, the training need not rely on training labels (e.g., as in the case of supervised training) or a large training dataset (e.g., as in the case of supervised and unsupervised training). Thus, the scalability to train the robot on different motions is more easily achievable. These and other advantages will become apparent from the description of the next figures.

In the interest of clarity explanation, embodiments of the present disclosure are described in connection with a robot model and a human model. However, the embodiments are not limited as such. Instead, the embodiments similarly apply to any target model, whether a human model, an animal model, or otherwise. Generally, each of the models include joints and links that define a skeletal architecture. The robot model and the target model can have different dimensionalities, such as degrees of freedom, of one or more of the joints. In addition, the number of joints and/or links and the physical property of the skeletal architectures of the robot model and the target model can be different.

FIG. 1 illustrates an example robot 110 mimicking a motion of a human 120, according to embodiments of the present disclosure. The robot 110 includes a computer system that hosts a non-linear approximator 112. The non-linear approximator 112 is trained to mimic one or more motions of the human 120.

As illustrated, the human 120 performs a hand waving gesture by which human arm and human hand are rotated around the human shoulder, elbow, and wrist. In turn, the robot 110 performs a similar hand waving gesture. In particular, this desired motion is identified to the non-linear approximator 112. The current positions of the robot's shoulder, elbow and wrist are also input to the non-linear approximator 112. In response, the non-linear approximator outputs control signals (e.g., joint angles) for moving the robot's shoulder, elbow and wrist in a way that copies the human hand waving gesture. The control signals are sent to different hardware controllers (e.g., actuators) of the robot 110 to move the robot's shoulder, elbow and wrist accordingly.

In an example, the non-linear approximator 112 approximates one or more human motions based on its training. The approximation generally relies on a non-linear function that uses parameters updated during the training of the non-linear approximator 112. For instance, the non-linear approximator 112 represents an artificial intelligence (AI) model that can be trained to output control signals for controlling joints of the robots given an input related to the joints, a pose of the robot torso, and the desired motion. In one illustration, the input includes, among other things, joint positions, joint velocities, joint torques, data related to the torso pose (e.g., its position, orientation, linear velocity, and angular velocity), and a phase of the desired motion. The training relies on motion capture data showing a human reference motion for a motion desired to be performed by the robot, where differences between directions of robot links and human links are used to learn the best way to control the movement of the joints. In an illustration, the AI model includes a set of neural networks and the training implements reinforcement learning, as further described in connection with the next figures.

Figure 2:
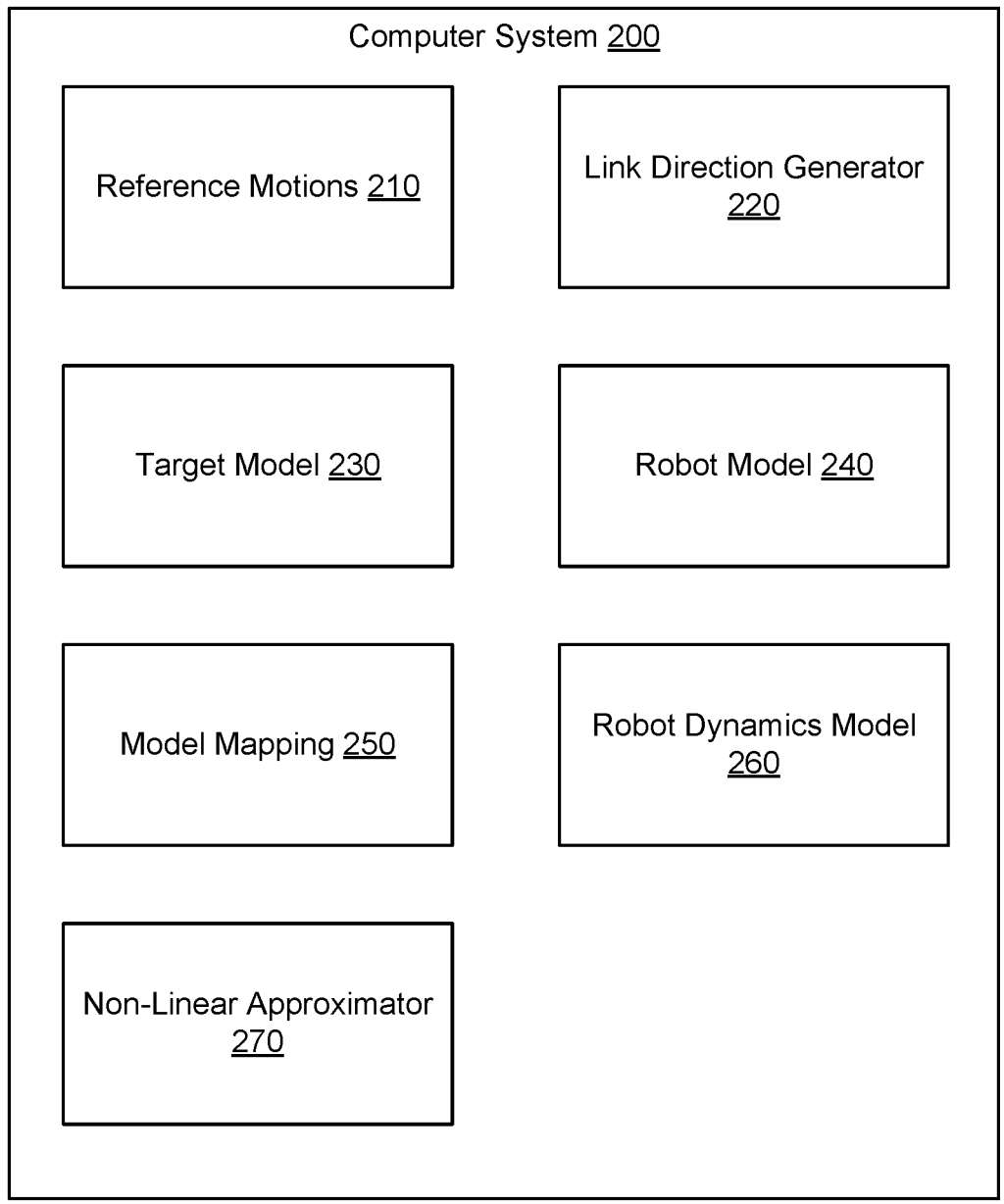
FIG. 2 illustrates example modules of a computer system for training a non-linear approximator of a robot, according to embodiments of the present disclosure.

FIG. 2 illustrates example modules of a computer system 200 for training a non-linear approximator of a robot, such as the non-linear approximator 112 of the robot 110 of FIG. 1, according to embodiments of the present disclosure. Each of the modules can be implemented as specialized computing hardware and/or specialized software hosted on general purpose computing hardware of the computer system 200.

As illustrated, the modules include reference motions 210, a link direction generator 220, a target model 230, a robot model 240, a model mapping 250, a robots dynamic model 260, and a non-linear approximator 270. The reference motions 210, link direction generator 220, target model 230, robot model 240, model mapping 250, and robot dynamics model 260 are generally involved in the training of the non-linear approximator 270.

In an example, the reference motions 210 are stored in the computer system 200.

However, the reference motions can be also or alternatively available to the computer system 200 from a remote network location or storage device. The reference motions 210 represent motions that non-linear approximator 270 learns to approximate. For instance, the reference motions 210 include motion capture data showing how a human performs a motion, where this motion is used as a reference motion during the training of the non-linear approximator 270. The motion capture data can be derived from image frames generated at a particular frequency (e.g., 60 Hz), where the image frames show the reference motion as a time-sequence of poses (e.g., a pose every 60 Hz, or the used image frame frequency). In an illustration, the motion capture data identifies each pose frame and, within each pose frame, data related to the joints, the torso orientation, and the reference motion (e.g., the joint positions, joint velocities, joint torques, torso orientation, torso angular velocity, and the phase of the reference motion). The target joint positions can include joint orientations that are expressed in quaternions.

The link direction generator 220 generates, from the reference motions 210, link directions of the human links (e.g., the human bones). In an example, a link direction represents a unit vector projected along the axis defined by the link. Each link is generally connected to at least one joint. The link direction of this link depends all joint positions in the kinematic tree connecting this link to the root. The link direction generator 220 derives the link direction from the quaternion defining the orientation of this joint. As generated, the link directions (e.g., the unit vectors) are used in the computation of a non-linear approximator's 270 reward function.

The target model 230 includes a skeletal representation of the target (e.g., the human). This representation is stored in the computer system 200. However, the skeletal representation can be also or alternatively available to the computer system 200 from a remote network location or storage device. In an example, the target model 230 is defined as a set of joints and links (referred to herein as target joints or human joints and target links or human links) relative to each other and/or a torso pose of the target. A target joint can be connected to one or more target links and can have a particular amount of degrees of freedom. Conversely, a target link can be connected to one or more target joints. The target model 230 is usable in the training to identify target links that should be matched.

The robot model 240 includes a skeletal representation of the robot. This representation is stored in the computer system 200. However, the skeletal representation can be also or alternatively available to the computer system 200 from a remote network location or storage device. In an example, the robot model 240 is defined as a set of joints and links (referred to herein as robot joints and robot links) relative to each other and/or a reference frame origin of the robot. A robot joint can be connected to one or more robot links and can have a particular amount of degrees of freedom. Conversely, a robot link can be connected to one or more robot joints. The skeletal representation of the robot can be different from the skeletal representation of the target, whereby a different number of joints and/or links, different degrees of freedom, and different physical properties (e.g., body mass distribution, size, etc.) are possible. The robot model 240 is usable in the training to identify robot links that should be matched and learn how to control the robot joints and, as applicable, move the center of body mass.

The model mapping 250 maps some of the target links with some of the robot links. For instance, when the number of target links is higher than that of the robot links, the model mapping 250 maps a subset of the target links to the robot links. This model mapping 250 is stored in the computer system 200. However, the model mapping 250 can be also or alternatively available to the computer system 200 from a remote network location or storage device. The model mapping is usable in the training to identify matched robot links and target links such that a difference between the corresponding robot links and target links as well as root orientation difference can be computed (e.g., distances between unit vectors).

The robot dynamics model 260 is used to simulate robot movements caused by torques applied by joint actuators and interaction with physical environment.

Joint actuator inputs are in place obtained from the nonlinear approximator 270. The nonlinear approximator produces joint actuator inputs at current moment in time having robot sensor readings at previous moment in time. Robot sensor readings may include joint position sensors, torso orientation and angular velocity, foot pressure sensors, etc.

Typically, during simulation robot sensor data is contaminated using random noise. Noise is applied at each simulation step. The noise simulates real sensor noise and affects resulting control robustness.

Also random noise is applied to robot link dynamical parameters (link mass, inertia tensor, joint actuator parameters.) This noise is applied once per animation sequence. It allows to make control system (nonlinear approximator) to be immune to dynamics model imperfectness.

In addition noise is applied to the nonlinear approximator's 270 output. This is a part of reinforcement learning exploration strategy. By doing so the training algorithm, explores new states and is able to optimize nonlinear approximator parameters in order to improve reward function over an animation sequence.

The reward function is a sum of rewards obtained at each image frame that show a sequence of steps for a motion (e.g., a motion animation). The reward function is computed in the following way.

The robot dynamics model 260 is used to obtain a robot pose at each moment in time. The robot pose is used to obtain direction unit vectors for each robot link, robot torso position, orientation, and/or ground contact information. Direction unit vectors of the robot model at each image frame are compared with reference the target model's direction unit vectors at the same moment in time. The same happens with torso pose data, ground contact information, etc.

The reward function value represents the quality of how well the simulated movement of the robot matches the target model (e.g., as shown in the animation sequence). Reward function values are used to adjust nonlinear approximator parameters in such a way that the reward function value monotonously improves (for example, increases) with algorithm iteration number.

The reward function is constructed by using, for instance, as a weighted sum of direction unit vectors difference absolute values of robot dynamics model versus target animation incremented by absolute value of torso pose difference.

In an example, the non-linear approximator 270 is implemented as a set of neural networks, where the training uses reinforcement learning. Within this set, a neural network is set to have three hidden layers, each with one hundred and twenty-eight neurons. Such a network can be easily embedded on a central processing unit of the robot and can have a very short processing time (e.g., less than one millisecond to run).

For the reinforcement learning, the "Agent" is the set of neural networks (e.g., the non-linear approximator 270). The "Action (A)" is the set of all possible movements of the joints and, optionally, the torso. A "Discount Factor ($\gamma$)" is multiplied by future rewards as discovered by the agent in order to dampen these rewards' effect on the agent's choice of action. The "Environment" is the simulation environment that uses the target model 230 and the robot model 240. The "State (S)" is a set of states, each of which is a concrete and immediate situation in which the agent finds itself (e.g., the orientation of a robot joint). The "Reward (R)" is the feedback by which the success or failure of an agent's actions is measured, where the Reward can be expressed as a reward function of a neural network and used to update parameters of this network (e.g., weights of connections between neurons) by iteratively adjusting those weights along gradients that promise less error (e.g., more rewards). The "Policy ($\pi$)" is the strategy that the agent employs to determine the next action based on the current state. The agent learns the Policy through training and this Policy can be set as one of the neural networks. The "Value (V)" is the expected long-term return with discount, as opposed to the reward. The "Action-Value or Value Function ($Q_\pi(s, a)$)" is the long-term return of the current state "s," taking action "a" under policy "$\pi$." The Action-Value maps state-action pairs to rewards and can be set as another neural network. The "Trajectory" is a sequence of states and actions that influence the states. These configuration elements for the reinforcement learning are further described in connection with the next figures.

Figure 3:
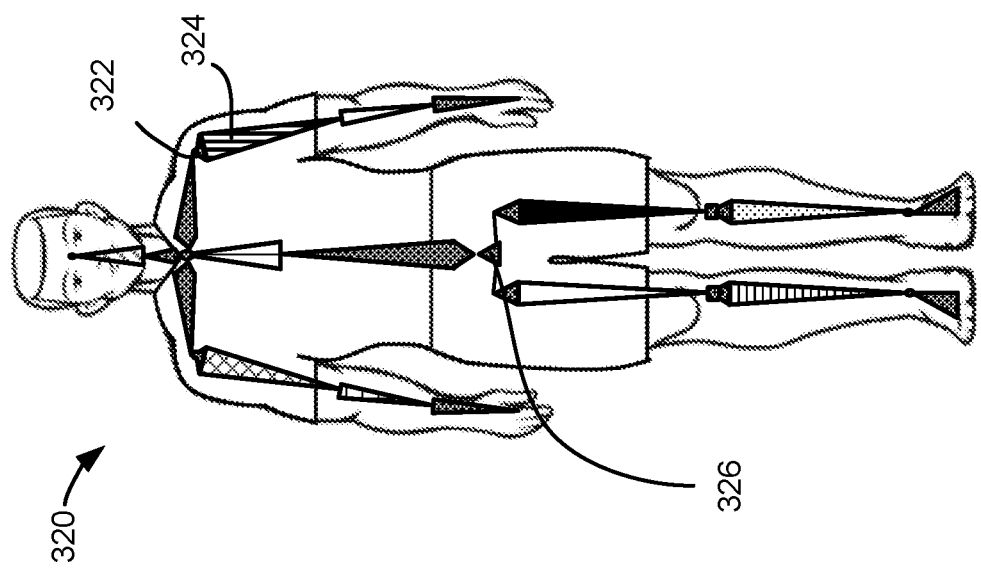
FIG. 3 illustrates an example robot model and an example human model, according to embodiments of the present disclosure.
Figure 3:
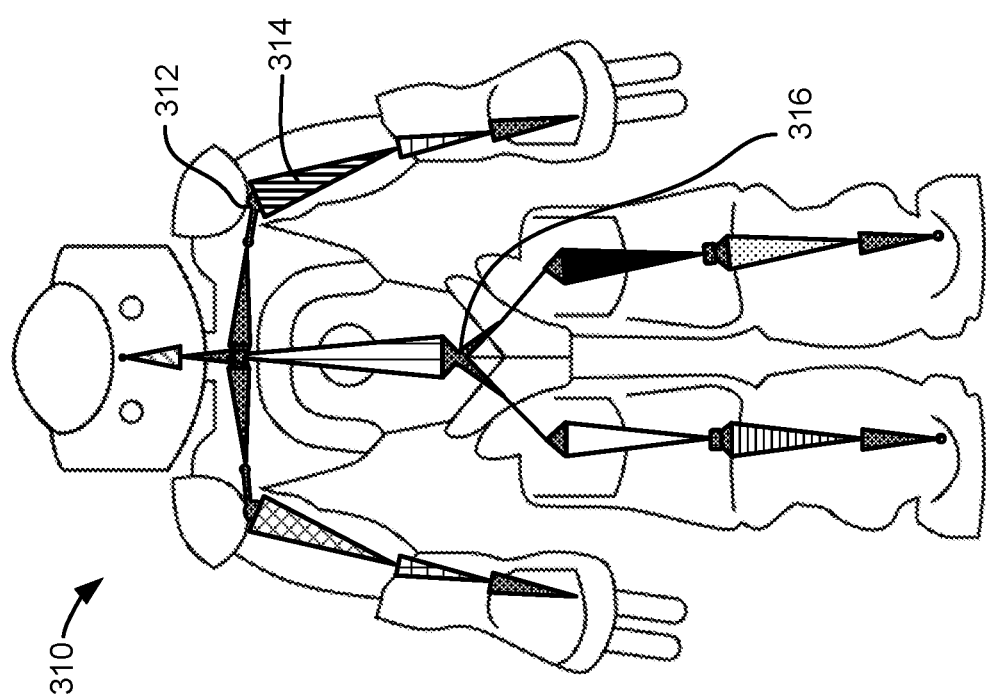

FIG. 3 illustrates an example robot model 310 and an example human model 320, according to embodiments of the present disclosure. The robot model 310 and the human model 320 are examples of the robot model 240 and the target model 250, respectively, of FIG. 2.

As illustrated, the robot model 310 includes a skeletal representation of a robot. This representation includes a set of robot joints 312, robot links 314, and a torso 316. The torso local reference frame 316 can be used as the root of a local coordinate system, where the positions of the robot joints 312 and robot links 314 can be expressed relative to the root. Features of the robot joints 312, such as their positions, velocities, and torques can be input to a non-linear approximator. Features of the local coordinate system 316, such as its position, orientation, linear velocity, and angular velocity, can also be input to the non-linear approximator. Directions of the robot links 314 can be used to compute the reward function of the non-linear approximator.

Similarly, the human model 320 includes a skeletal representation of a human. This representation includes a set of human joints 322, human links 324, and a torso center of mass 326. The torso internal reference frame 326 can be used as the root of a local coordinate system, where the positions of the human joints 322 and human links 324 can be expressed relative to the root. During the training of the non-linear approximator, the directions of the human links 324 can be used to compute the reward function.

As also illustrated in the FIG. 3, the human model 320 has a larger number of human joints 322 and human links than the robot model 310. The torsos 316 and 326 and the skeletal sizes are also different. In addition, at least some of the human joints 322 have larger degrees of freedom than corresponding robot joins 312. Generally, the architectures of human joints 322 have can differ from those of the robot joints 312, resulting in the differences in the degrees of freedom. For instance, the human model 320 includes ball joints with up to three degrees of freedom per human joint controlled by muscles, whereas the robot model 310 includes hinge joints with one degree of freedom per robot joint.

Figure 4:
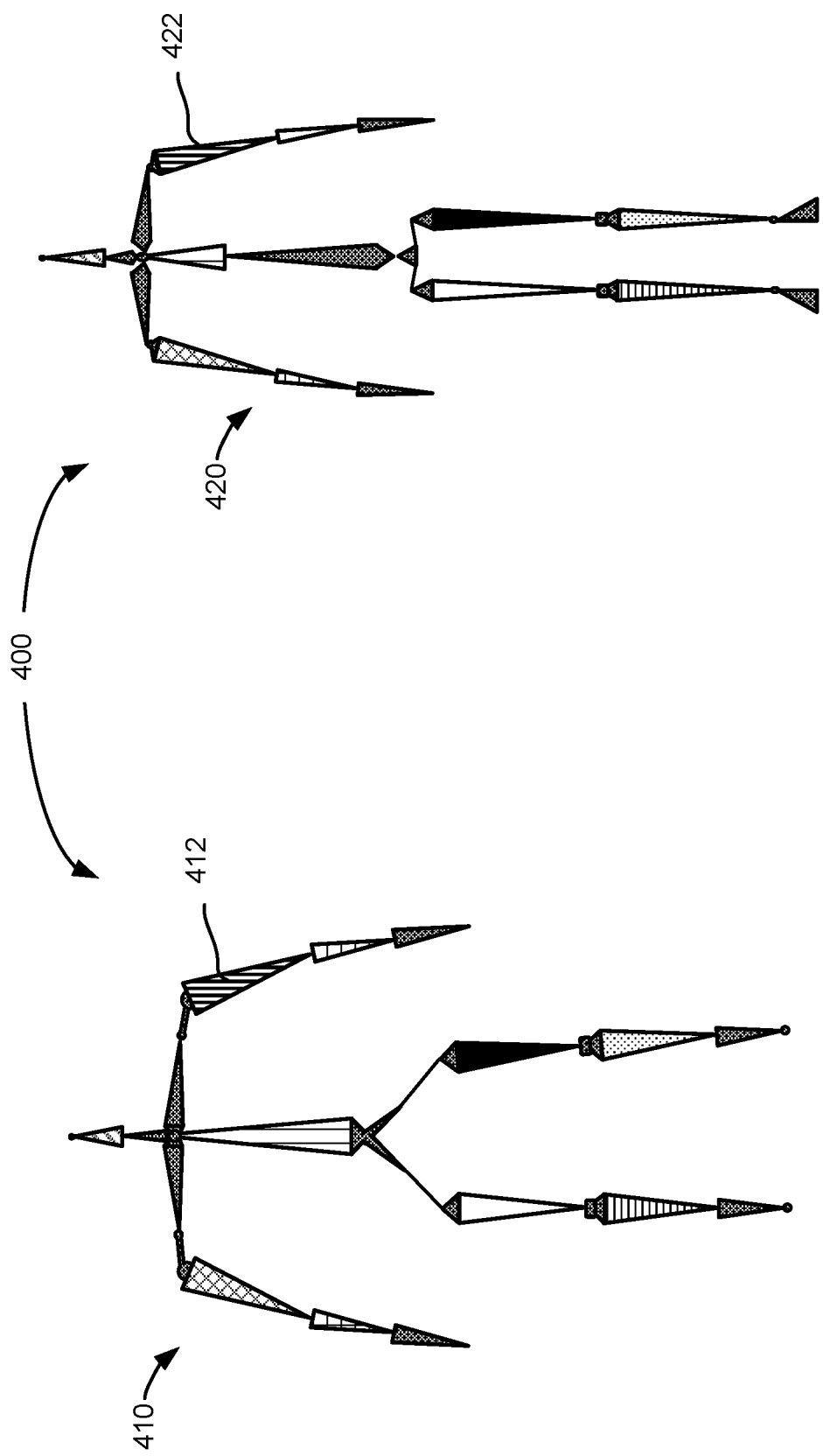
FIG. 4 illustrates an example mapping between links of a robot model and links of a human model, according to embodiments of the present disclosure.

FIG. 4 illustrates an example mapping 400 between links 412 of a robot model 410 and links 422 of a human model 420, according to embodiments of the present disclosure. The mapping 400 is an example of the model mapping 250 of FIG. 2. The robot model 410 and the human model 420 are examples of the robot model 310 and the human model 320, respectively, of FIG. 3. As such, the robot model 410 has fewer robot links 412 than the number of human links 422 of the human model 420. The mapping associates the robot links 412 with a subset of the human links 422, where an association between a robot link and a human link indicates that the robot link is matched and corresponds to the human link. These associations can be stored as pairs (e.g., {identifier of robot link; identifier of human link}).

For instance, the right forearm of the robot model 410 corresponds to the right forearm of the human model 420. Accordingly, the mapping 400 identifies that the robot right forearm is matched with the human right forearm. In comparison, the spine in the human model 420 includes two portions: an upper spine and a lower spine. However, the robot model 410 includes one integral spine. As illustrated in FIG. 3, the robot spine is mapped to the human upper spine. And the human lower spine has no association with a robot link. FIG. 3 illustrates a specific example of the mapping 400 by using patterns, where a same pattern on a robot link and a human link indicate that these two links are mapped to each other.

In addition to the differences in the links themselves, the joints connected to the links can be different. For instance, the robot shoulder joint connected to the robot upper arm link is a hinge joint with one degree of freedom. In comparison, the corresponding human joint is a ball joint with up to three degrees of freedom. This difference in the dimensionality presents a technical challenge for training the robot.

Figure 5:
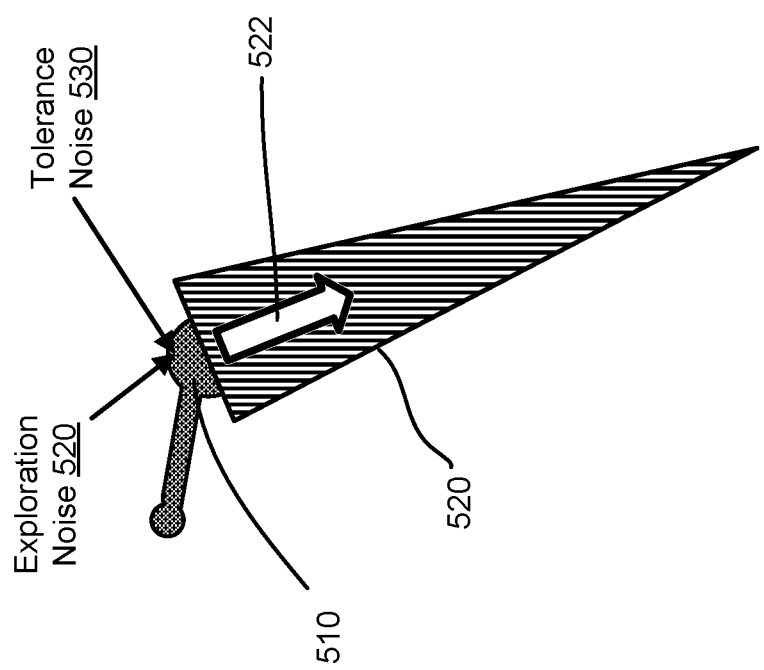
FIG. 5 illustrates an example simulation of a robot joint of a robot model, according to embodiments of the present disclosure.

FIG. 5 illustrates an example simulation of a robot joint 510 of a robot model, according to embodiments of the present disclosure. The robot joint 510 can be simulated by a joint simulator, similar to the joint simulator 260 of FIG. 2. As illustrated in this figures, the robot joint 510 is a hinge joint with one degree of freedom. In comparison, a corresponding human joint is a ball joint.

As illustrated, a robot link 520 is connected to the robot joint 510. The robot joint 510 is simulated by using perturbations and the simulation results in a change to at least one of the position, orientation, velocity, or torque of the robot joint 510. In turn, this change causes a change to at least one of the position, orientation, velocity, or torque of the robot link 520. In an example, the change to the robot link 520 results in a particular link direction of the robot link 520. The link direction can be expressed as a unit vector 522 along the axis defined by the robot link 520. The link direction can be derived from the change to the robot joint 520. For instance, the unit vector 522 is derived from the quaternion orientation of the robot joint 510.

Generally, the simulation of the robot joint 510 moves the robot joint 510 in an exploration space. The resulting link direction (e.g. the unit vector 522) is used in the computation of the reward function of a non-linear approximator, such that the optimal movement of the robot joint 510 can be learned.

Different types of perturbation are possible to simulate the robot joint 510. In an example, one type includes exploration noise 520 set as Gaussian noise. Another type includes tolerance noise 530 also set as Gaussian noise. As explained herein above, the exploration noise 520 is used to move the robot joint 510 within the exploration space. In comparison, the tolerance noise 530 is used to modify this movement within the exploration space to account for an error tolerance between the robot model and the actual robot.

Figure 6:
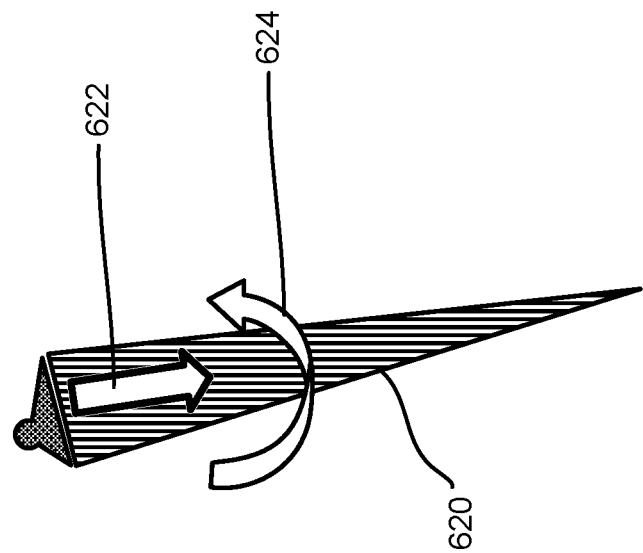
FIG. 6 illustrates example directions of links of a robot model and a human model usable in the training of a non-linear approximator of a robot, according to embodiments of the present disclosure.
Figure 6:
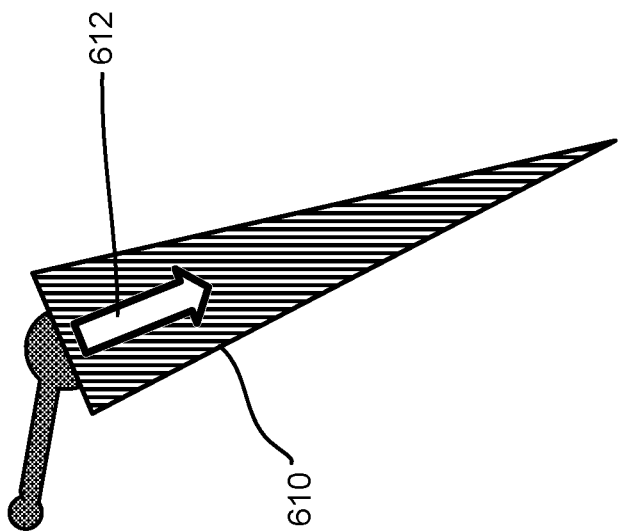

FIG. 6 illustrates example directions of links of a robot model and a human model usable in the training of a non-linear approximator of a robot, according to embodiments of the present disclosure. As illustrated a robot link 610 (e.g., robot left upper arm) is associated with a human link 620 (e.g., human left upper arm) based on a mapping (e.g., the mapping 400 of FIG. 4). A unit vector 612 is computed for the robot link 610 (referred to herein as a robot unit vector) and corresponds to the direction of the robot link 610. Similarly, a unit vector 622 is computed for the human link 620 (referred to herein as a human unit vector) and corresponds to the direction of the human link 620.

The distance, such as the Euclidean distance, between the robot unit vector 612 and the human unit vector 622 can be computed and used in the reward function of a non-linear approximator. The smaller that distance is, the higher the reward is during the training. During the training, the orientation 624 of the human link 622 (and, similarly, the orientation of the robot link 610) are not used in the computation of the reward function.

In an example, the training is repeated across multiple pose frames, where each frame corresponds to an image of the human link 622 in a particular link direction, and where the collection of the image frames represents a time-sequence of poses that form a reference motion. In each image frame, the human unit vector 622 is used as ground truth. For that image frame, the training is iterative, where the robot joint is iteratively simulated resulting in different link directions of the robot link 610 (e.g., in different robot unit vectors). Distances between each of these robot unit vectors and the human unit vector 622 as well as torso orientation in space and torso angular velocity (which can be used to preserve balance) are computed and used in the reward function to find the closest robot unit vector to the human unit vector 622 and learn the optimal movement of the robot joint that resulted in the closes robot unit vector. The distance computation, reward function computation, and updates to the parameters of the non-linear approximator are repeated across the image frames.

In an example, and referring back to the computing components illustrated in FIGS. 2-6, a non-linear approximator is implemented as a set of neural networks trained based on reinforcement learning. Reference motions and a robot model are used to train the non-linear approximator such that this approximator learns to synthesize a controller that enables the robot model to mimic the reference motions. Each reference motion is represented as a sequence of target poses $\{\vec{q}_t\}$. A control policy $\pi(a_t|s_t)$ maps the state of the robot model $s_t$ to an action $a_t$, which is a control input for each of the robot joints, such as join angles, torques, etc. The reference motions are used to define a reward $r(s_t,a_t)$. The final result is a policy that enables the robot model to mimic behaviors from the reference motions. The policy is modeled using a neural network and trained using the proximal policy optimization algorithm.

Given a collection of pose frames showing a reference motion, represented by a sequence of target poses $\{\vec{q}_t\}$, the goal of the policy is to reproduce the desired motion in a simulation environment. Since a reference motion only provides kinematic information in the form of target poses, the policy is responsible for determining which actions should be applied at each time-step in order to realize the desired trajectory.

The state "s" describes the configuration of the robot model, with features including the relative positions, velocities, and torques of each robot joint and position, orientation, linear velocity, and angular velocity of the torso (e.g., the root position, orientation, linear velocity, and angular velocity). Input features also include a variable identifying a phase ϕ of the motion, where ϕ∈[0, 1], ϕ=0 denotes the start of the motion, and ϕ=1 denotes its end. The action "a" from the policy specifies a joint control input.

The policy "π" is represented by a neural network that maps a given state "s" to a distribution over action "π(a|s)." The neural network has three hidden layers, each with one hundred twenty-eight neurons. The action distribution is modeled as a Gaussian noise, with a state dependent mean "$\mu(s)$" specified by the network, and a diagonal covariance matrix $\Sigma$: $\pi(a|s)=N(\mu(s), \Sigma)$. The value function is modeled by a similar network.

The reward "$r_t$" at each step "t" (e.g., where the step "t" corresponds to a pose frame of the motion capture data) biases the robot model to match the reference motion $\{\tilde{q}_t\}$. The reward "$r_t$" can include a number of terms that reward the robot model for matching particular characteristics of the reference motion such as the link directions and, optionally, link angular velocities and quaternion orientations of the links, torso orientation and angular velocity. Each of such reward terms can be computed for a robot link that is mapped to a human link as the difference between the robot link and the human link, where the difference is specific to the term (e.g., difference between link directions such as unit vectors as shown in FIG. 6, differences between angular velocities, and difference between quaternion orientations). A total reward at each step can be the same of the individual reward terms, each of which corresponds to a robot link. In addition a binary term (e.g., "0" or "1") is included in the individual rewards to indicate whether a robot link is on the ground or not.

Two neural networks are maintained, one for the policy "$\pi(a|s)$" and another for the value function "$V(s)$." The value function is updated using target values and the policy is updated using gradients.

Figure 7:
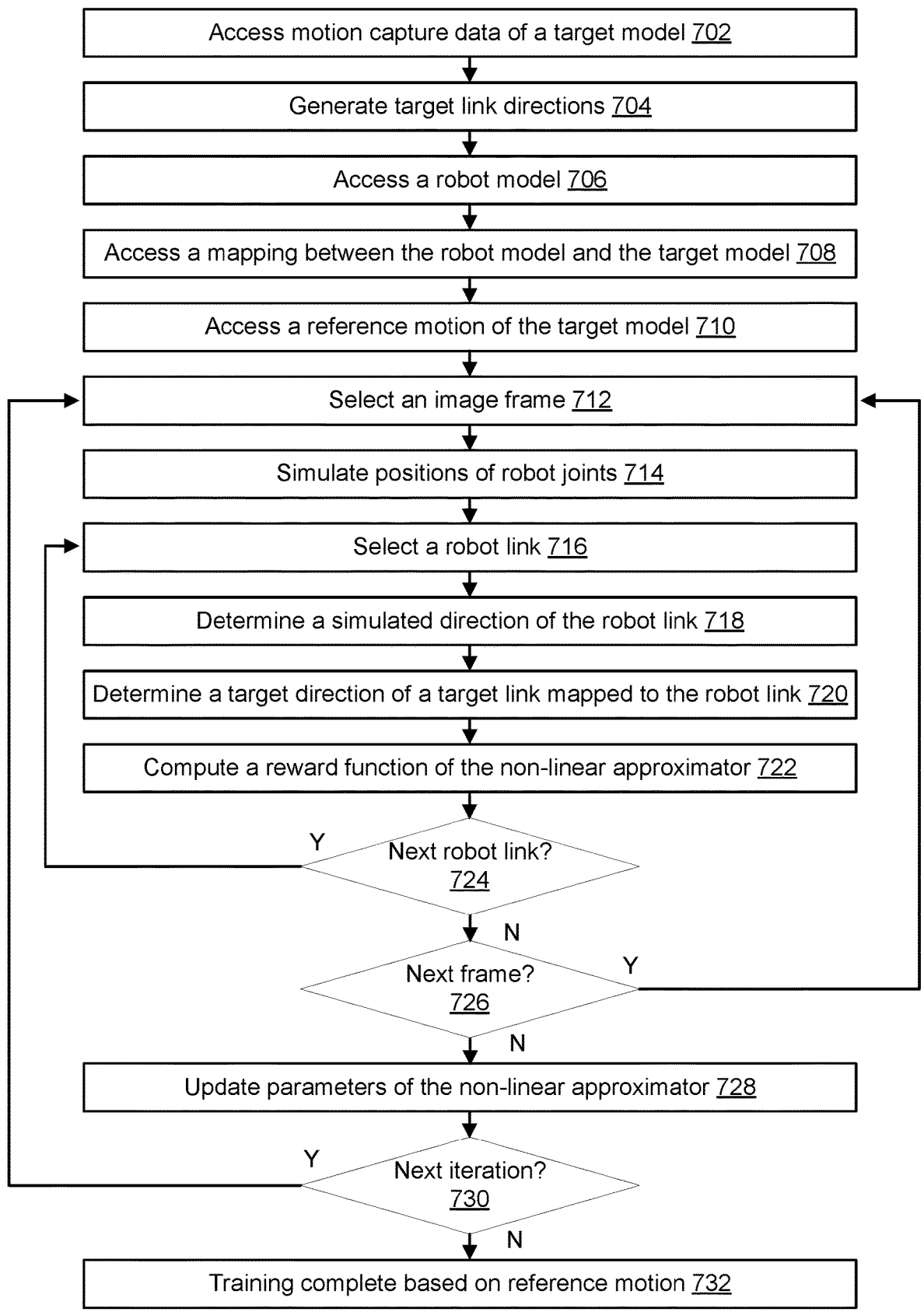
FIG. 7 illustrates an example flow for training a non-linear approximator of a robot, according to embodiments of the present disclosure.

FIG. 7 illustrates an example flow for training a non-linear approximator of a robot, according to embodiments of the present disclosure. The operations of the flow can be implemented as hardware circuitry and/or stored as computer-readable instructions on a non-transitory computer-readable medium of a computer system, such as the computer system 200 of FIG. 2. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

In an example, the training relies on a sequence of steps corresponding to pose frames of a human. The training includes, at each step, simulating all the robot joints and updating a reward function based on a comparison of the resulting robot link directions to the human robot link directions, and repeating the simulation of the robot joints and the update to the reward function throughout the sequence. Once the entire sequence has been processed, parameters of the non-linear approximator are updated. The training can then be iteratively repeated to restart the simulation.

In an example, the flow includes an operation 702, where the computer system accesses motion capture data of a target model. The motion capture data is generated based on image frames showing a target associated with the targeted model. Each of the image frames shows a pose of the target while performing a reference motion (e.g., is a pose image). The image frames are generated at a particular frequency (e.g., 60 Hz). In an illustration, the motion capture data is derived from the image frames, identifies each image frame. For each image frame, the motion capture data further identifies a phase of the reference motion corresponding to the image frame, identifies each link, and includes position, orientation, angular velocity of each link in the image frame. The computer system accesses the motion capture data from local memory of the computer system or from a remote network location.

In an example, the flow includes an operation 704, where the computer system generates target link directions. Each target link direction corresponds to a direction of a target link of the target model in an image frame. A target link direction can be computed from the quaternion orientation of the target link in the image frame, where this orientation is available from the motion capture data for that image frame.

In an example, the flow includes an operation 706, where the computer system accesses a robot model. The robot model can be accessed from the local memory or from a remote network location. In an illustration, the robot model includes robot joints and robot links. At least one of the robot joints has an amount of degrees of freedom that is smaller than an amount of degrees of freedom or a corresponding target joint.

In an example, the flow includes an operation 708, where the computer system accesses a mapping between the robot model and the target model. The mapping can be a model mapping and can be accessed from the local memory or from a remote network location. The mapping associates at least a subset of the target links with the robot links.

In an example, the flow includes an operation 710, where the computer system accesses a reference motion of the target model. The reference model can be identified and can correspond to a set of the motion capture data that shows how the target performs the reference motion. In an illustration, accessing the reference motion includes accessing the set of the motion capture data and the image frames from the local memory or from a remote network location based on the identifier of the reference motion.

In an example, the flow includes an operation 712, where the computer system selects an image frame. In an illustration, each image frame is a pose image that corresponds to a step in a time-sequence of poses that form the motion. The selection can be sequential based on the timing, where image frame corresponding to the initial step is selected first and the image frame corresponding to the last step is selected last.

In an example, the flow includes an operation 714, where the computer system simulates positions of robot joints. In an illustration, simulating a position can include moving a robot joint and/or changing an orientation of this joint. Such simulation results in a potential change to a robot link connected to the robot joint in the three dimensional space. The simulation can include using one or more types of perturbations, such as Gaussian noise. In a further example, the robot joints are simulated to produce a current pose from a previous pose (e.g., one corresponding to a previous pose frame).

In particular, simulating the joints may include multiple sub-operations. In a first sub-operation, a state of a robot dynamics model may be initialized. Next, a reward value may be initialized (or reset for a training iteration). Pose data may be retrieved from the robot dynamics model and input to the non-linear approximator. The non-linear approximator may generate robot joint actuator input that may be provided to the robot dynamics model. In turn, the robot dynamics may produce pose data corresponding to a simulation of the robot joints.

In an example, the flow includes an operation 716, where the computer system selects a robot link. The robot link is mapped to a target link shown in the selected image frame. The motion capture data of the target link for that image frame can be accessed.

In an example, the flow includes an operation 718, where the computer system determines a simulated direction of the robot link. In an illustration, the simulated direction can be computed as a unit vector of the robot link along the axis defined by the robot link in the current pose. This unit vector can be derived from the quaternion orientation of the robot joint.

In an example, the flow includes an operation 720, where the computer system determines a target direction of the target link that is mapped to the robot link. In an illustration, the target direction can be a unit vector of the target link along the axis defined by the target link, where this unit vector was generated under operation 704.

In an example, the flow includes an operation 722, where the computer system computes a reward function of the non-linear approximator. In an illustration, the reward function includes a reward term that biases the non-linear approximator to match the simulated direction of the robot link with the target direction of the target link. This reward term can be computed as the difference between the two unit vectors. The reward function can include another reward term computed based on, for instance, the difference between the angular velocities of the robot link and target link and a binary term taking a binary value depending on whether the robot link is on the ground or not. Other terms also include the norm of the root orientation error, as well as the root angular velocity error term.

In an example, the flow includes an operation 724, where the computer system determines whether a next robot link should be selected or not. In an illustration, the selected image frame shows a number of target links. Each of such target links is mapped to a robot link that, in turn, is connected to a robot joint. The computer system should repeat operation 716-724 for each of such robot joints (and, equivalently robot links) such that the reward function can be computed as the sum of the individual rewards. Hence, if any of such robot joints has not been selected yet, the computer system loops back to operation 716. Otherwise, operation 726 is performed.

In an example, the flow includes an operation 726, where the computer system determines whether a next image frame should be selected or not. In an illustration, the training spans over the full collection of image frames that show the reference motion. Accordingly, if any of such image frames has not been selected yet, the computer system loops back to operation 712. In this loop, the computer system may also obtain new pose data that corresponds to the next image frame, where the new pose data may be obtained from the current pose data according to the above sub-operations. Otherwise, operation 728 is performed.

In an example, the flow includes an operation 728, where the computer system updates parameters of the non-linear approximator based on the reward function. In an illustration, the non-linear approximator includes a neural network for a value function and a neural network for a policy. The parameters of each of the neural network can include weights of connections between the neurons of the neural network. The value function is updated using target values and the policy is updated using gradients.

In an example, the flow includes an operation 730, where the computer system determines whether a next iteration should be performed. In an illustration, a maximum number of iterations is used in the training. If the maximum number of iterations is reached, operation 732 is performed. Otherwise, the computer system loops back to operation 712. In another illustration, the robot joints are simulated in each iteration using an exploration noise. This noise is Gaussian noise with a variance that reduces as the number of iterations increases. Once the variance reaches a predetermined threshold, the computer system determines that no further iterations are needed and proceeds to operation 732. Otherwise, the computer system loops back to operation 712.

In an example, the flow includes an operation 732, where the computer system determines that the training of the non-linear approximated is complete based on the reference motion. Such training can be repeated for other reference motions.

Figure 8:
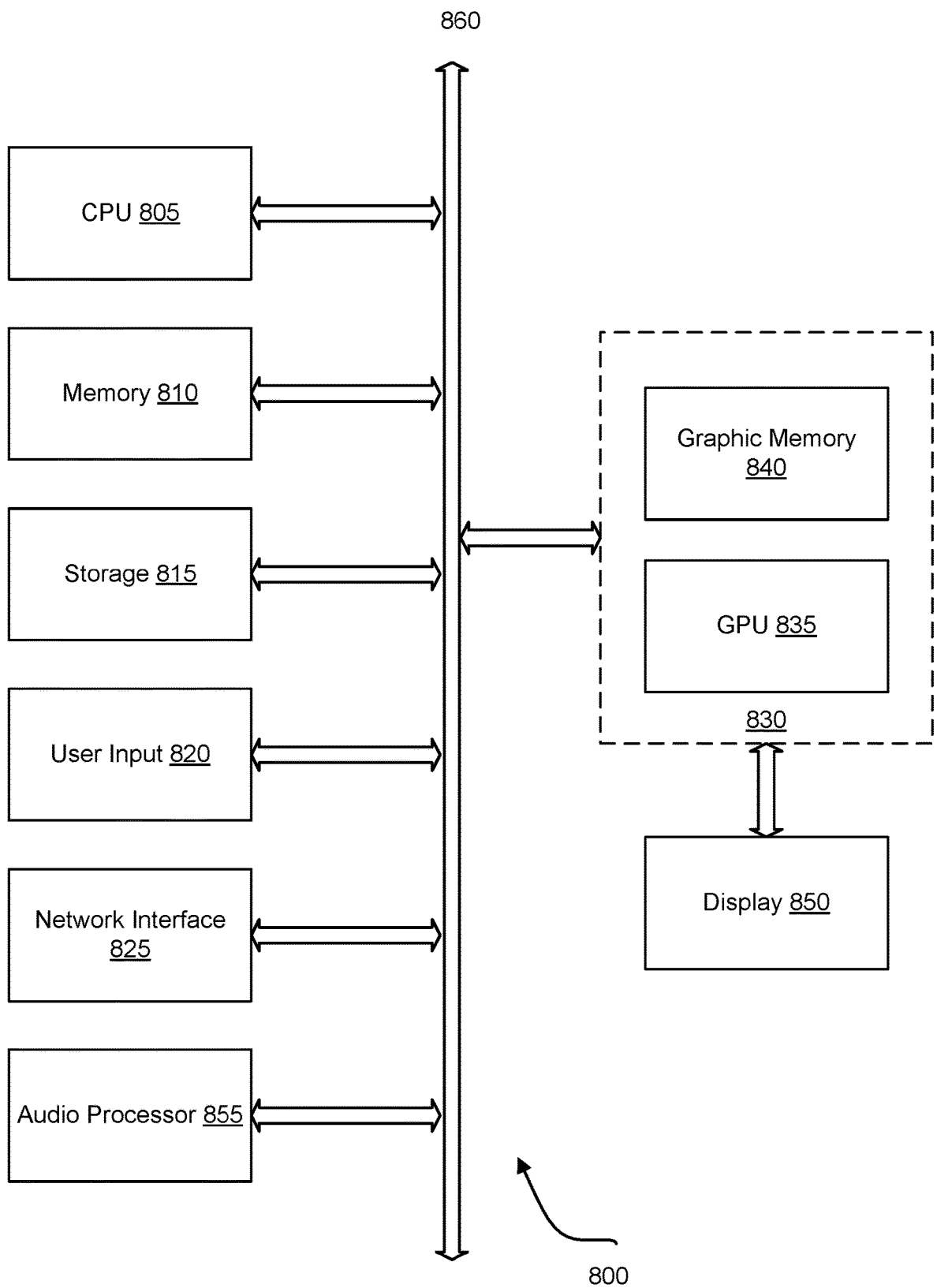
FIG. 8 illustrates an example of a hardware system suitable for implementing a computer system, according to embodiments of the present disclosure.

FIG. 8 illustrates an example of a hardware system suitable for implementing a computer system 800 in accordance with various embodiments. The computer system 800 represents, for example, components of the computer system 200 illustrated in connection with FIG. 2. The computer system 800 includes a central processing unit (CPU) 805 for running software applications and optionally an operating system. The CPU 805 may be made up of one or more homogeneous or heterogeneous processing cores. Memory 810 stores applications and data for use by the CPU 805. Storage 815 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 820 communicate user inputs from one or more users to the computer system 800, examples of which may include keyboards, mice, joysticks, touch pads, touch screens, still or video cameras, and/or microphones. Network interface 825 allows the computer system 800 to communicate with other computer systems via an electronic communications network, and may include wired or wireless communication over local area networks and wide area networks such as the Internet. An audio processor 855 is adapted to generate analog or digital audio output from instructions and/or data provided by the CPU 805, memory 810, and/or storage 815. The components of computer system 800, including the CPU 805, memory 810, data storage 815, user input devices 820, network interface 825, and audio processor 855 are connected via one or more data buses 860.

A graphics subsystem 830 is further connected with the data bus 860 and the components of the computer system 800. The graphics subsystem 830 includes a graphics processing unit (GPU) 835 and graphics memory 840. The graphics memory 840 includes a display memory (e.g., a frame buffer) used for storing pixel data for each pixel of an output image. The graphics memory 840 can be integrated in the same device as the GPU 835, connected as a separate device with the GPU 835, and/or implemented within the memory 810. Pixel data can be provided to the graphics memory 840 directly from the CPU 805. Alternatively, the CPU 805 provides the GPU 835 with data and/or instructions defining the desired output images, from which the GPU 835 generates the pixel data of one or more output images. The data and/or instructions defining the desired output images can be stored in the memory 810 and/or graphics memory 840. In an embodiment, the GPU 835 includes 3D rendering capabilities for generating pixel data for output images from instructions and data defining the geometry, lighting, shading, texturing, motion, and/or camera parameters for a scene. The GPU 835 can further include one or more programmable execution units capable of executing shader programs.

The graphics subsystem 830 periodically outputs pixel data for an image from the graphics memory 840 to be displayed on the display device 850. The display device 850 can be any device capable of displaying visual information in response to a signal from the computer system 800, including CRT, LCD, plasma, and OLED displays. The computer system 800 can provide the display device 850 with an analog or digital signal.

In accordance with various embodiments, the CPU 805 is one or more general-purpose microprocessors having one or more processing cores. Further embodiments can be implemented using one or more CPUs 805 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 66%, 75%, 80%, 90%, 95%, 99%, 99.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A computer-implemented method implemented by a computer system, the computer-implemented comprising:
   accessing a robot model of a robot, wherein the robot model comprises a robot joint and a robot link, wherein the robot joint is connected to the robot link;
   accessing a mapping between the robot link and a target link of a target model, wherein the target model comprises a target joint and the target link, wherein the target joint is connected to the target link;
   accessing a reference motion of the target model that corresponds to a sequence of pose frames; and
   training a non-linear approximator to output joint control signals such that the robot mimics the reference motion while preserving balance, the training comprising, for a particular pose frame of the sequence of pose frames:
   simulating a position of the robot joint;
   providing the position of the robot joint to the non-linear approximator;
   determining a simulated direction of the robot link based on a change in the position of the robot joint, the simulated direction of the robot link corresponding to a first unit vector that is projected along a first axis defined by the robot link;

determining a target direction of the target link based on the reference motion, the target direction of the target link corresponding to a second unit vector that is projected along a second axis defined by the target link; and computing a reward function of the non-linear approximator based on the simulated direction of the robot link and the target direction of the target link and based on root orientation and root angular velocity of the robot model, the reward function including a distance between the first unit vector and the second unit vector that biases the non-linear approximator to match the simulated direction of the robot link with the target direction of the target link; and updating parameters of the non-linear approximator based on the reward function.

2. The computer-implemented method of claim 1, wherein the non-linear approximator comprises a set of neural networks, and wherein the training comprises reinforcement learning that uses a distance metric between the simulated direction of the robot link, the target direction of the target link, the root orientation, and the root angular velocity.

3. The computer-implemented method of claim 1, wherein the reward function further comprises a norm of a root orientation error, and a root angular velocity error term.

4. The computer-implemented method of claim 1, wherein accessing the reference motion comprises accessing motion capture data of the target model, wherein the motion capture data identifies target links of the target model in multiple pose frames, and target directions of the target links in each pose frame.

5. The computer-implemented method of claim 4, wherein the target directions are determined from positions of target joints of the target model.

6. The computer-implemented method of claim 4, wherein the training comprises multiple pose simulation iterations corresponding to the sequence of pose frames, wherein the position of the robot joint is updated in each simulation iteration.

7. The computer-implemented method of claim 6, wherein the mapping maps a subset of the target links of the target model with robot links of the robot model, wherein each simulation iteration frame comprises computing simulated directions of the robot links and target directions of the subset of the target links, and wherein the reward function is computed based on the simulated directions, the target directions, the root orientation, and the root angular velocity.

8. The computer-implemented method of claim 1, wherein the training further comprises inputting a control signal of a robot joint actuator, a phase of a motion of the robot, and reference data of a root of the robot to the non-linear approximator.

9. The computer-implemented method of claim 1, wherein the reward function is further computed based on a simulated angular velocity of the robot link, a target angular velocity of the target link, and an indicator of whether the robot link is on ground.

10. The computer-implemented method of claim 1, wherein the position of the robot joint is simulated in a training iteration, and wherein simulating the position of the robot joint comprises adding first noise to a previous position of the robot joint and root data in a previous training iteration, the first noise corresponding to a perturbation of the robot joint in an exploration space.

11. The computer-implemented method of claim 10, wherein simulating the position of the robot joint further comprises adding second noise to the previous position of the robot joint, the second noise corresponding to an error tolerance between the robot model and the robot.

12. The computer-implemented method of claim 1, further comprising: installing the non-linear approximator in the robot upon completion of the training, wherein the robot inputs data about a pose to the non-linear approximator and receives an output from the non-linear approximator controlling robot motion.

13. The computer-implemented method of claim 1, wherein the robot joint has a first amount of degrees of freedom, and the target joint has a second amount of degrees of freedom that is larger than the first amount.

14. A computer system comprising:
a processor; and
a memory storing computer-readable instructions that, upon execution by the processor, cause the computer system to:
access a robot model of a robot, wherein the robot model comprises a robot joint and a robot link, wherein the robot joint is connected to the robot link;
access a mapping between the robot link and a target link of a target model, wherein the target model comprises a target joint and the target link, wherein the target joint is connected to the target link;
access a reference motion of the target model that corresponds to a sequence of pose frames; and
train a non-linear approximator to output joint control signals such that the robot mimics the reference motion while preserving balance, the training comprising, for a particular pose frame of the sequence of pose frames:
simulating a position of the robot joint;
providing the position of the robot joint to the non-linear approximator;
determining a simulated direction of the robot link based on a change in the position of the robot joint, the simulated direction of the robot link corresponding to a first unit vector that is projected along a first axis defined by the robot link;
determining a target direction of the target link based on the reference motion, the target direction of the target link corresponding to a second unit vector that is projected along a second axis defined by the target link; and
computing a reward function of the non-linear approximator based on the simulated direction of the robot link and the target direction of the target link and based on root orientation and root angular velocity of the robot model, the reward function including a distance between the first unit vector and the second unit vector that biases the non-linear approximator to match the simulated direction of the robot link with the target direction of the target link; and
updating parameters of the non-linear approximator based on the reward function.

15. The computer system of claim 14, wherein accessing the reference motion comprises accessing motion capture data of the target model, wherein the motion capture data identifies target links of the target model in multiple frames, and target directions of the target links in each frame.

16. The computer system of claim 15, wherein the target directions are determined from positions of target joints of the target model.

17. The computer system of claim 15, wherein the training comprises multiple pose simulation iterations corresponding to the sequence of pose frames, wherein the position of the robot joint is updated in each simulation iteration.

18. The computer system of claim 17, wherein the mapping maps a subset of the target links of the target model with robot links of the robot model, wherein each simulation iteration frame comprises computing simulated directions of the robot links and target directions of the subset of the target links, and wherein the reward function is computed based on the simulated directions, the target directions, the root orientation, and the root angular velocity.

19. A non-transitory computer-readable medium storing computer-readable instructions that, upon execution on a computer system, cause the computer system to perform operations comprising:
- accessing a robot model of a robot, wherein the robot model comprises a robot joint and a robot link, wherein the robot joint is connected to the robot link;
- accessing a mapping between the robot link and a target link of a target model, wherein the target model comprises a target joint and the target link, wherein the target joint is connected to the target link;
- accessing a reference motion of the target model that corresponds to a sequence of pose frames; and
- training a non-linear approximator to output joint control signals such that the robot mimics the reference motion while preserving balance, the training comprising, for a particular pose frame of the sequence of pose frames:
  - simulating a position of the robot joint;
  - providing the position of the robot joint to the non-linear approximator;
  - determining a simulated direction of the robot link based on a change in the position of the robot joint, the simulated direction of the robot link corresponding to a first unit vector that is projected along a first axis defined by the robot link;
  - determining a target direction of the target link based on the reference motion, the target direction of the target link corresponding to a second unit vector that is projected along a second axis defined by the target link; and
  - computing a reward function of the non-linear approximator based on the simulated direction of the robot link and the target direction of the target link and based on root orientation and root angular velocity of the robot model, the reward function including a distance between the first unit vector and the second unit vector that biases the non-linear approximator to match the simulated direction of the robot link with the target direction of the target link; and
  - updating parameters of the non-linear approximator based on the reward function.

20. The non-transitory computer-readable medium of claim 19, wherein the non-linear approximator comprises a set of neural networks, and wherein the training comprises reinforcement learning that uses a distance metric between the simulated direction of the robot link and the target direction of the target link and that uses the root orientation, and the root angular velocity.

21. The non-transitory computer-readable medium of claim 19, wherein the reward function further comprises a norm of a root orientation error, and a root angular velocity error term.

* * * * *